(12) United States Patent
Lee et al.

(10) Patent No.: US 12,200,371 B2
(45) Date of Patent: Jan. 14, 2025

(54) IMAGE SENSOR AND IMAGE PROCESSING SYSTEM

(71) Applicant: SK hynix Inc., Gyeonggi-do (KR)

(72) Inventors: Sung Ryong Lee, Gyeonggi-do (KR); Jong Hyun Ra, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 170 days.

(21) Appl. No.: 17/900,256

(22) Filed: Aug. 31, 2022

(65) Prior Publication Data

US 2023/0217119 A1    Jul. 6, 2023

(30) Foreign Application Priority Data

Dec. 31, 2021 (KR) .......................... 10-2021-0194335

(51) Int. Cl.
| | |
|---|---|
| H04N 23/84 | (2023.01) |
| G02B 3/00 | (2006.01) |
| H01L 27/146 | (2006.01) |
| H04N 25/11 | (2023.01) |
| H04N 25/13 | (2023.01) |
| H04N 25/46 | (2023.01) |
| H04N 25/51 | (2023.01) |
| H04N 25/704 | (2023.01) |
| H04N 25/77 | (2023.01) |
| H04N 25/778 | (2023.01) |
| H04N 25/78 | (2023.01) |

(52) U.S. Cl.
CPC .......... *H04N 23/84* (2023.01); *G02B 3/0056* (2013.01); *H04N 25/77* (2023.01)

(58) Field of Classification Search
CPC ........ H04N 25/84; H04N 25/77; H04N 25/11; H04N 25/134; H04N 25/46; H04N 25/51; H04N 25/59; H04N 25/704; H04N 25/78; H04N 25/778; G02B 3/0056; H01L 27/14603; H01L 27/14605; H01L 27/14645

See application file for complete search history.

(56) References Cited

U.S. PATENT DOCUMENTS

| | | | | |
|---|---|---|---|---|
| 7,745,779 | B2 * | 6/2010 | Conners ............... | H04N 25/778 250/226 |
| 10,109,038 | B2 * | 10/2018 | Wei ...................... | H04N 25/447 |
| 11,626,447 | B2 * | 4/2023 | Kim ...................... | H01L 27/146 |
| 11,736,821 | B1 * | 8/2023 | Zhou ..................... | H04N 25/11 |
| 2009/0200451 | A1 * | 8/2009 | Conners ................ | G01J 3/50 250/208.1 |
| 2012/0293695 | A1 * | 11/2012 | Tanaka ................. | H04N 25/134 348/280 |

(Continued)

FOREIGN PATENT DOCUMENTS

| | | |
|---|---|---|
| KR | 10-2019-0106380 A | 9/2019 |
| KR | 10-2020-0052036 A | 5/2020 |
| KR | 10-2020-0142440 A | 12/2020 |

*Primary Examiner* — Marly S Camargo
(74) *Attorney, Agent, or Firm* — IP & T GROUP LLP

(57) ABSTRACT

Disclosed is an image sensor including: a center pixel group including 2×2 pixels having different colors in a center area of a 6×6 unit pixel group; and first to fourth color pixel groups having the same color as one pixel of the center pixel group, disposed as units of 2×4 pixels or 4×2 pixels to have a shape surrounding the center pixel group, and having different colors.

21 Claims, 10 Drawing Sheets

(56) References Cited

U.S. PATENT DOCUMENTS

2014/0307137 A1\* 10/2014 Tanaka ................. H04N 25/134
    348/280
2017/0094210 A1\* 3/2017 Gluskin ............... H04N 25/704
2021/0126033 A1\* 4/2021 Yang .................... H04N 25/133

\* cited by examiner

IMAGE SENSOR AND IMAGE PROCESSING SYSTEM

CROSS-REFERENCE TO RELATED APPLICATION(S)

This application claims priority under 35 U.S.C. § 119 to Korean Patent Application No. 10-2021-0194335, filed on Dec. 31, 2021 the disclosure of which is incorporated herein by reference in its entirety.

BACKGROUND

1. Field

Various embodiments of the present disclosure relate to a data semiconductor circuit, and more particularly, to an image sensor and an image processing system.

2. Description of the Related Art

The computer environment paradigm has shifted to ubiquitous computing systems in which a computer system can be used anywhere and anytime. As a result, use of portable electronic devices, such as mobile phones, digital cameras and notebook computers, has been increasing rapidly.

Image sensing devices widely used in such electronic devices may capture images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensor and an image processing system that may include 2×2 pixels having different colors in a center area of 6×6 unit pixels, thereby implementing, while using an existing 2×2 driving mode and increasing, a 4-sum mode or 8-sum mode operation in a quad pattern to increase output readout speed of the image sensor.

In accordance with an embodiment of the present disclosure, an image sensor may include a center pixel group including 2×2 pixels having at least two different colors and disposed in a center area of a 6×6 unit pixel group; and first to fourth color pixel groups each corresponding to respective colors, disposed as units of 2×4 pixels or 4×2 pixels to surround the center pixel group.

In accordance with an embodiment of the present disclosure, an image sensor may include a first sub-color pixel group including a plurality of first photodiodes and a first floating diffusion node sharing the plurality of first photodiodes; a second sub-color pixel group including a plurality of second photodiodes and a second floating diffusion node sharing the plurality of second photodiodes; and a dual gain conversion transistor suitable for selectively coupling the first floating diffusion node to the second floating diffusion node, wherein the first sub-color and second sub-color pixel groups have the same color pixel.

In accordance with an embodiment of the present disclosure, an image processing system may include a first sub-color pixel group including a plurality of first photodiodes and a first floating diffusion node sharing the plurality of first photodiodes; a second sub-color pixel group including a plurality of second photodiodes and a second floating diffusion node sharing the plurality of second photodiodes; and a dual gain conversion transistor suitable for selectively coupling the first floating diffusion node to the second floating diffusion node, wherein the first sub-color and second sub-color pixel groups have the same color pixel.

In accordance with an embodiment, an image sensor may include a center pixel group having at least two sub-pixel groups each corresponding to different colors; and a plurality of boundary pixel groups each corresponding to respective colors, and disposed to surround the center pixel group.

DETAILED DESCRIPTION

Figure 1:
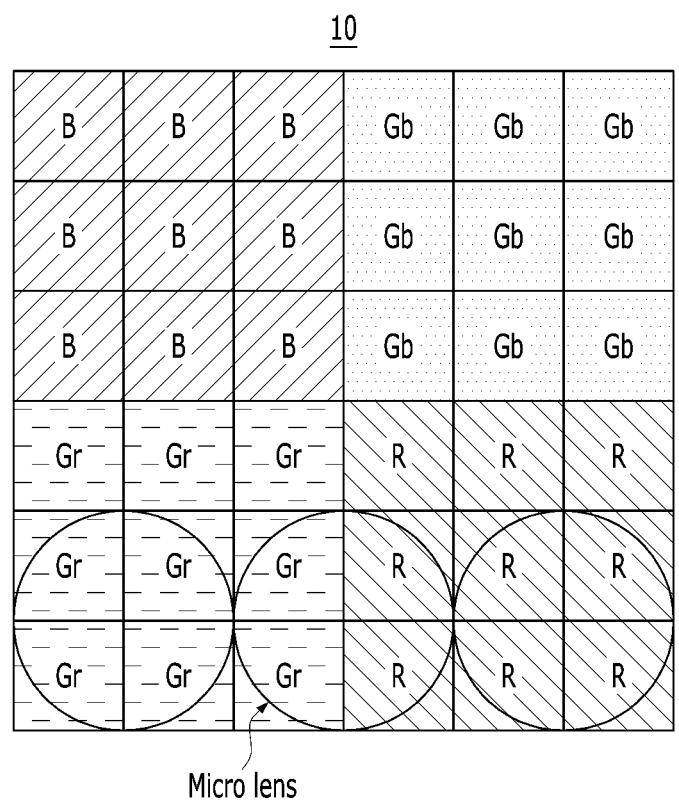
FIG. 1 is a diagram illustrating one type of pixel array that has been proposed, disposed as a 6×6 unit pixel group having four nona-cells.

Various embodiments of the present disclosure are described below with reference to the accompanying drawings, in order to describe in detail the present disclosure so that those with ordinary skill in art to which the present disclosure pertains may easily carry out the technical spirit of the present disclosure.

Throughout the disclosure, like reference numerals refer to like parts throughout the various figures and embodiments of the present disclosure.

Hereinafter, a pixel array including a 6×6 unit pixel group will be described with reference to FIG. 1. FIG. 1 is a diagram illustrating one type of pixel array that has been proposed, disposed as the 6×6 unit pixel group having the four nona-cells.

A 6×6 pixel group 10 illustrated in FIG. 1 includes a first nona-cell, a second nona-cell, a third nona-cell and a fourth nona-cell.

The first nona-cell is arranged with 3×3 pixels each having a B color, the second nona-cell is arranged with 3×3 pixels each having a Gb color, the third nona-cell is arranged with 3×3 pixels each having a Gr color, and the fourth nona-cell is arranged with 3×3 pixels each having an R color.

When nine (3×3) pixels included in each of the first to fourth nona-cells are driven simultaneously, 9-sum data may be read out. However, since the nine pixels included in each of the first to fourth nona-cells are not an even number of pixels, it is impossible to extract a phase difference for all the pixels through micro-lenses disposed in the first to fourth nona-cells. This is because, when color filters provided under (in a vertical direction) the micro-lenses have different colors, it is difficult to determine whether a difference in readout values is a difference due to the colors or a phase difference due to focus of the micro-lenses.

Figure 2:
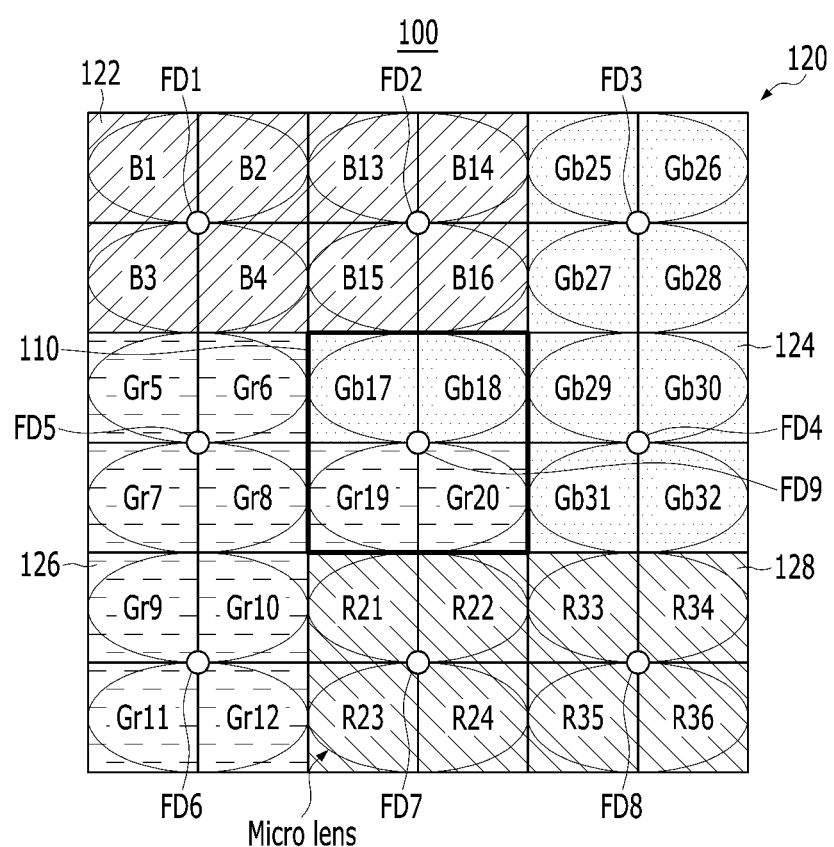
FIG. 2 is a diagram illustrating an image sensor including a pixel array disposed as a 6×6 unit pixel group in accordance with an embodiment of the present disclosure.
Figure 3:
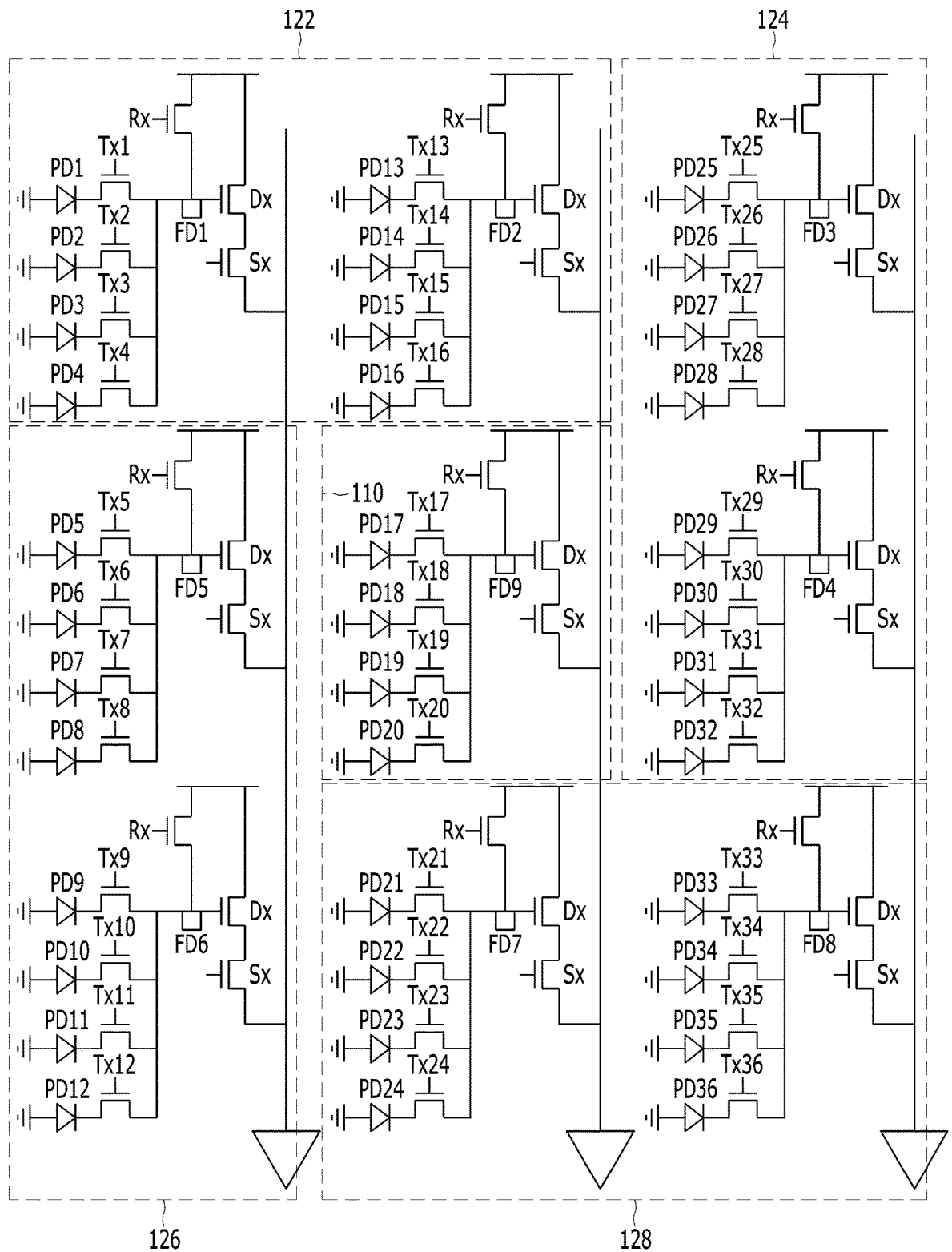
FIG. 3 is a diagram illustrating a detailed circuit of the pixel array illustrated in FIG. 2 in accordance with an embodiment of the present disclosure.
Figure 4:
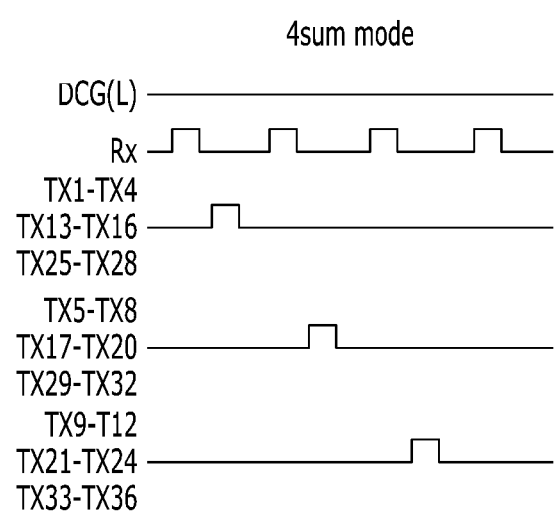
FIG. 4 is a diagram illustrating 4-sum mode output timing of the image sensor illustrated in FIG. 3 in accordance with an embodiment of the present disclosure.

Hereinafter, an image sensor 100 in accordance with an embodiment is described with reference to FIGS. 2 to 4. FIG. 2 is a diagram illustrating the image sensor 100 including a pixel array disposed as a 6×6 unit pixel group in accordance with an embodiment of the present disclosure, FIG. 3 is a diagram illustrating a detailed circuit of the pixel array illustrated in FIG. 2 in accordance with an embodiment of the present disclosure, and FIG. 4 is a diagram illustrating output timing of the image sensor 100 illustrated in FIG. 2 in accordance with the embodiment of the present disclosure.

The image sensor 100 in accordance with an embodiment includes a center pixel group 110, a color pixel group 120 and micro-lenses, in the 6×6 unit pixel group.

The center pixel group 110 is disposed as 2×2 pixels in a center area of the 6×6 unit pixel group and has different colors. The center pixel group 110 may include a first center pixel group Gb17 and Gb18 of 1×2 pixels each having a Gb color and a second center pixel group Gr19 and Gr20 of 1×2 pixels each having a Gr color.

The first center pixel group Gb17 and Gb18 of the center pixel group 110 may have the same color pixels as a second color pixel group 124 of the color pixel group 120, and the second center pixel group Gr19 and Gr20 may have the same color pixels as a third color pixel group 126 of the color pixel group 120. A position of the first center pixel group Gb17 and Gb18 and the second center pixel group Gr19 and Gr20 may be switched.

Referring to FIG. 3, electric charges sensed by four photodiodes PD17, PD18, PD19 and PD20 included in the first center pixel group Gb17 and Gb18 and the second center pixel group Gr19 and Gr20 of the center pixel group 110 may be transferred to and accumulated in a floating diffusion node FD9 by switching four transmission transistors Tx17, Tx18, Tx19 and Tx20. That is, in the center pixel group 110, the four photodiodes PD17, PD18, PD19 and PD20 and the four transmission transistors Tx17, Tx18, Tx19 and Tx20 may share one floating diffusion node FD9.

The color pixel group 120 includes a first color pixel group 122, a second color pixel group 124, a third color pixel group 126 and a fourth color pixel group 128, each having different colors.

The first to fourth color pixel groups (i.e., boundary pixel groups) 122, 124, 126 and 128 may be disposed as units of 2×4 pixels or 4×2 pixels to surround the center pixel group 110.

That is, the first color pixel group 122 of 2×4 pixels (B1, B2, B3, B4, B13, B14, B15 and B16) each having a B color may be disposed at the upper left, the second color pixel group 124 of 4×2 pixels (Gb25, Gb26, Gb27, Gb28, Gb29, Gb30, Gb31 and Gb32) each having a Gb color may be disposed at the upper right, the third color pixel group 126 of 4×2 pixels (Gr5, Gr6, Gr7, Gr8, Gr9, Gr10, Gr11 and Gr12) each having a Gr color may be disposed at the lower left, and the fourth color pixel group 128 of 2×4 pixels (R21, R22, R23, R24, R33, R34, R35 and R36) each having an R color may be disposed at the lower right.

Referring to FIG. 3, each of the first to fourth color pixel groups 122, 124, 126 and 128 may include a first sub-color pixel group and a second sub-color pixel group.

More specifically, in the first sub-color pixel group B1, B2, B3 and B4 of the first color pixel group 122, electric charges sensed by four first photodiodes PD1, PD2, PD3 and PD4 may be transferred to and accumulated in a first floating diffusion node FD1 by switching four transmission transistors Tx1, Tx2, Tx3 and Tx4. That is, in the first sub-color pixel group B1, B2, B3 and B4 of the first color pixel group 122, the four first photodiodes PD1, PD2, PD3 and PD4 and the four transmission transistors Tx1, Tx2, Tx3 and Tx4 may share one first floating diffusion node FD1.

Since configurations and operations of reset transistors Rx, driving transistors Dx and selection transistors Sx are well known to those skilled in the art, descriptions thereof are omitted.

In the second sub-color pixel group B13, B14, B15 and B16 of the first color pixel group 122, electric charges sensed by four second photodiodes PD13, PD14, PD15 and PD16 may be transferred to and accumulated in a second floating diffusion node FD2 by switching four transmission transistors Tx13, Tx14, Tx15 and Tx16. That is, in the second sub-color pixel group B13, B14, B15 and B16 of the first color pixel group 122, the four second photodiodes PD13, PD14, PD15 and PD16 and the four transmission transistors Tx13, Tx14, Tx15 and Tx16 may share one second floating diffusion node FD2.

In the first sub-color pixel group Gb25, Gb26, Gb27 and Gb28 of the second color pixel group 124, electric charges sensed by four first photodiodes PD25, PD26, PD27 and PD28 may be transferred to and accumulated in a first floating diffusion node FD3 by switching four transmission transistors Tx25, Tx26 Tx27 and Tx28.

In the second sub-color pixel group Gb29, Gb30, Gb31 and Gb32 of the second color pixel group 124, electric charges sensed by four second photodiodes PD29, PD30, PD31 and PD32 may be transferred to and accumulated in a second floating diffusion node FD4 by switching four transmission transistors Tx29, Tx30, Tx31 and Tx32.

In the first sub-color pixel group Gr5, Gr6, Gr7 and Gr8 of the third color pixel group 126, electric charges sensed by four first photodiodes PD5, PD6, PD7 and PD8 may be transferred to and accumulated in a first floating diffusion node FD5 by switching four transmission transistors Tx5, Tx6 Tx7 and Tx8.

In the second sub-color pixel group Gr9, Gr10, Gr11 and Gr12 of the third color pixel group 126, electric charges sensed by four second photodiodes PD9, PD10, PD11 and PD12 may be transferred to and accumulated in a second floating diffusion node FD6 by switching four transmission transistors Tx9, Tx10, Tx11 and Tx12.

In the first sub-color pixel group R21, R22, R23 and R24 of the fourth color pixel group 128, electric charges sensed by four first photodiodes PD21, PD22, PD23 and PD24 may be transferred to and accumulated in a first floating diffusion node FD7 by switching four transmission transistors Tx21, Tx22 Tx23 and Tx24.

In the second sub-color pixel group R33, R34, R35 and R36 of the fourth color pixel group 128, electric charges sensed by four second photodiodes PD33, PD34, PD35 and PD36 may be transferred to and accumulated in a second floating diffusion node FD8 by switching four transmission transistors Tx33, Tx34, Tx35 and Tx36.

The micro-lenses may be left-right symmetrically disposed as units of 1×2 pixels at the top of each of the first to fourth color pixel groups 122, 124, 126 and 128 and the first center pixel group Gb17 and Gb18 and the second center pixel group Gr19 and Gr20 of the center pixel group 110 to detect phase differences therebetween.

That is, the micro-lenses may be symmetrically disposed in a horizontal direction for each 1×2 pixel in the 6×6 unit pixel group.

As illustrated in FIGS. 2 and 3, each of the center pixel group 110 and the first to fourth color pixel groups 122, 124, 126 and 128 may be formed in an even-numbered array and thus may use an existing 2×2 pixel driving method, and perform a 4-sum mode operation in a quad pattern.

Referring to FIG. 4, an analog-to-digital converter (ADC) of the image sensor 100 including the 6×6 unit pixel group may perform a readout operation at only third timing in a 4-sum mode.

That is, at a first timing after a reset signal (Rx) having a high level (H) is applied to the reset transistor, the readout operation is performed on the transmission transistors TX1 to TX4 included in the first sub-color pixel group B1, B2, B3 and B4 of the first color pixel group 122, the transmission transistors TX13 to TX16 included in the second sub-color pixel group B13, B14, B15 and B16 of the first color pixel group 122, and the transmission transistors TX25 to TX28 included in the first sub-color pixel group Gb25, Gb26, Gb27 and Gb28 of the second color pixel group 124. Subsequently, at a second timing, the readout operation is performed on the transmission transistors TX5 to TX8 included in the first sub-color pixel group Gr5, Gr6, Gr7 and Gr8 of the third color pixel group 126, the transmission transistors TX17 to TX20 included in the center pixel group 110, and the transmission transistors TX29 to TX32 included in the second sub-color pixel group Gb29, Gb30, Gb31 and Gb32 of the second color pixel group 124.

At a third timing, the readout operation is performed on the transmission transistors TX9 to TX12 included in the second sub-color pixel group Gr9, Gr10, Gr11 and Gr12 of the third color pixel group 126, the transmission transistors TX21 to TX24 included in the first sub-color pixel group R21, R22, R23 and R24 of the fourth color pixel group 128, and the transmission transistors TX33 to TX36 included in the second sub-color pixel group R33, R34, R35 and R36 of the fourth color pixel group 128.

Figure 5:
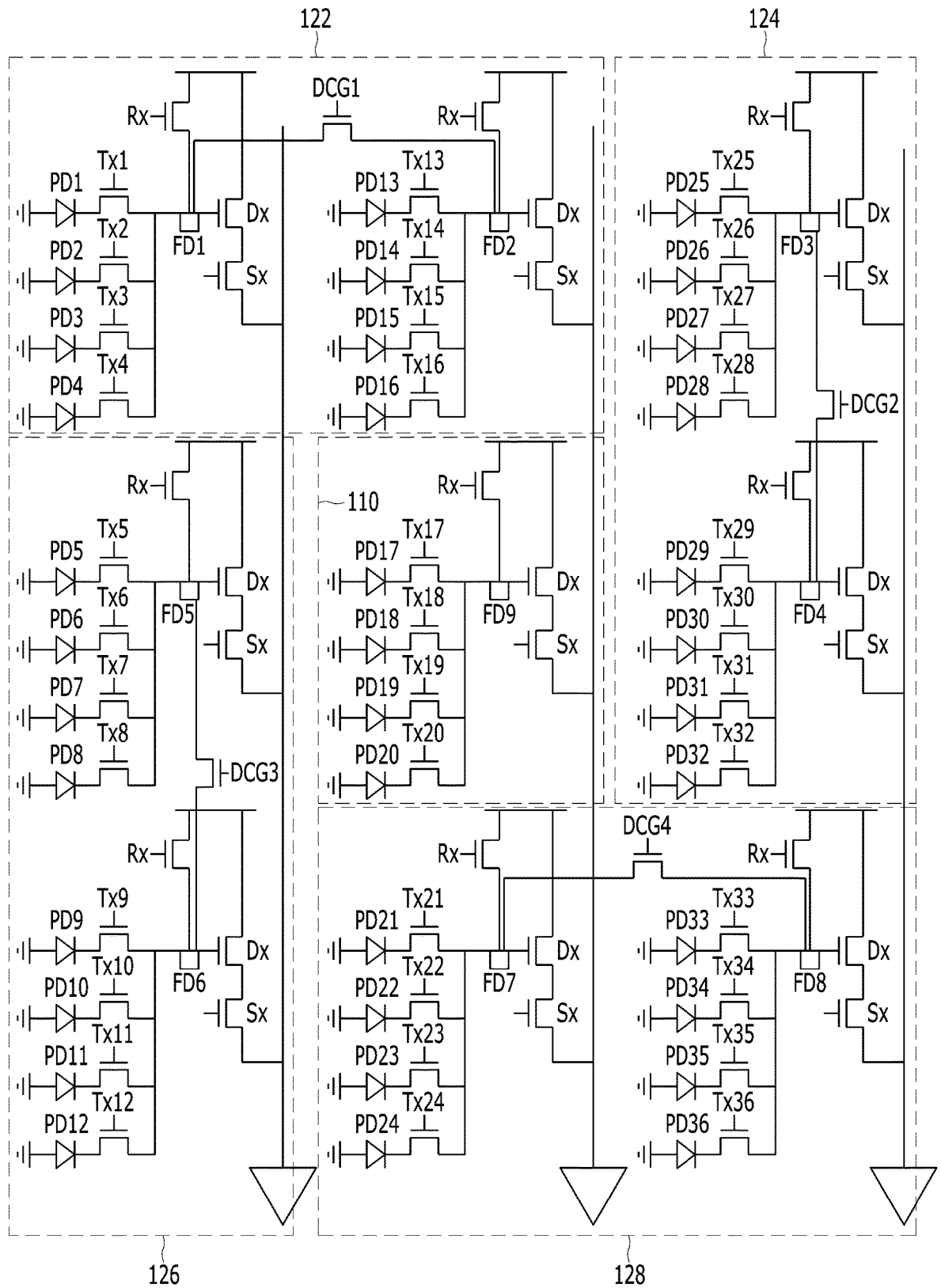
FIG. 5 is a diagram illustrating a detailed circuit of a pixel array disposed as a 6×6 unit pixel group in accordance with an embodiment of the present disclosure.
Figure 6:
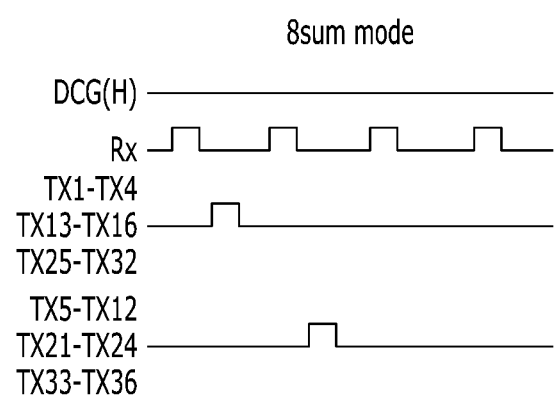
FIG. 6 is a diagram illustrating 8-sum mode output timing of the image sensor illustrated in FIG. 5 in accordance with an embodiment of the present disclosure.

Hereinafter, an image sensor according to another embodiment of the present disclosure is described with reference to FIGS. 5 and 6. FIG. 5 is a diagram illustrating a detailed circuit of a pixel array disposed as a 6×6 unit pixel group in accordance with the embodiment of the present disclosure, and FIG. 6 is a diagram illustrating 8-sum mode output timing of the image sensor illustrated in FIG. 5 in accordance with the embodiment of the present disclosure.

Since the pixel array disposed as the 6×6 unit pixel group illustrated in FIG. 5 is the same as the pixel array disposed as the 6×6 unit pixel group illustrated in FIG. 3 except for dual gain conversion transistors, descriptions of the other components except for the dual gain conversion transistors DCG1, DCG2, DCG3 and DCG4 are omitted.

The dual gain conversion transistors DCG1, DCG2, DCG3 and DCG4 may selectively couple two floating diffusion nodes corresponding to the same color.

That is, the first dual gain conversion transistor DCG1 may selectively couple the first floating diffusion node FD1 included in the first color pixel group 122 to the second floating diffusion node FD2 included in the first color pixel group 122, and the second dual gain conversion transistor DCG2 may selectively couple the third floating diffusion node FD3 included in the second color pixel group 124 to the fourth floating diffusion node FD4 included in the second color pixel group 124.

The third dual gain conversion transistor DCG3 may selectively couple the fifth floating diffusion node FD5 included in the third color pixel group 126 to the sixth floating diffusion node FD6 included in the third color pixel group 126, and the fourth dual gain conversion transistor DCG4 may selectively couple the seventh floating diffusion node FD7 included in the fourth color pixel group 128 to the eighth floating diffusion node FD8 included in the fourth color pixel group 128.

Referring to FIG. 6, an analog-to-digital converter (ADC) of the image sensor including the 6×6 unit pixel group may perform a readout operation at only a second timing in an 8-sum mode.

That is, when a voltage having a high level (H) is applied each of the first to fourth dual gain conversion transistors DCG1, DCG2, DCG3 and DCG4, the first and second floating diffusion nodes FD1 and FD2 included in the first color pixel group 122 are coupled to each other, the third and fourth floating diffusion nodes FD3 and FD4 included in the second color pixel group 124 are coupled to each other, the fifth and sixth floating diffusion nodes FD5 and FD6 included in the third color pixel group 126 are coupled to each other, and the seventh and eighth floating diffusion nodes FD7 and FD8 included in the fourth color pixel group 128 are coupled to each other.

That is, the pixels B1 to B4 and B13 to B16 included in the first color pixel group 122, the pixels Gb25 to Gb32 included in the second color pixel group 124, the pixels Gr5 to Gr12 included in the third color pixel group 126 and the pixels R21 to R24 and R33 to R36 included in the fourth color pixel group 128 may each operate in the 8-sum mode.

Accordingly, the transmission transistors TX1 to TX4 and TX13 to TX16 included in the first color pixel group 122 and the transmission transistors TX25 to TX28 and TX 29 to TX32 included in the second color pixel group 124 are turned on at a first timing after a reset signal (Rx) having a high level is applied to the reset transistor.

Subsequently, the transmission transistors TX5 to TX12 included in the third color pixel group 126 and the transmission transistors TX21 to TX24 and TX33 to TX36 included in the fourth color pixel group 128 are turned on at a second timing.

Accordingly, the readout speed of the analog-to-digital converter (ADC) of the image sensor may increase by 150%.

Figure 7:
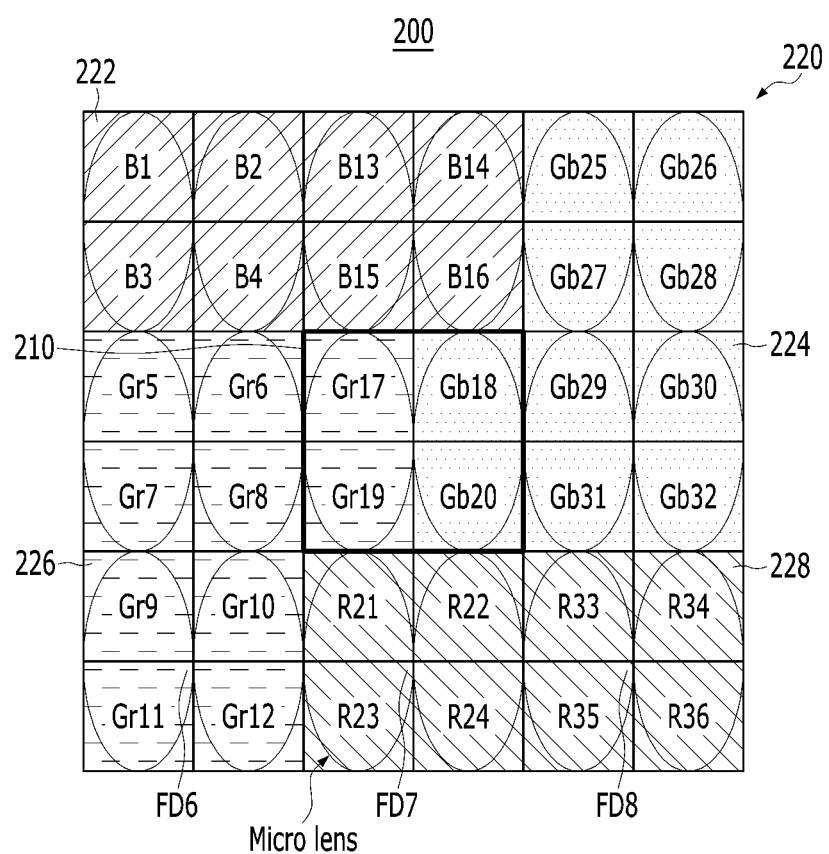
FIG. 7 is a diagram illustrating an image sensor including a pixel array disposed as a 6×6 unit pixel group in accordance with an embodiment of the present disclosure.

Hereinafter, an image sensor 200 including a pixel array disposed as a 6×6 unit pixel group according to still another embodiment of the present disclosure is described with reference to FIG. 7. FIG. 7 is a diagram illustrating the image sensor 200 including the pixel array disposed as the 6×6 unit pixel group in accordance with an embodiment of the present disclosure.

As illustrated in FIG. 7, the image sensor 200 according to the embodiment includes a center pixel group 210, a color pixel group 220 and micro-lenses, in the 6×6 unit pixel group.

The center pixel group 210 is disposed as 2×2 pixels in a center area of the 6×6 unit pixel group and has different colors. The center pixel group 210 may include a first center pixel group Gb18 and Gb20 of 2×1 pixels each having a Gb color and a second center pixel group Gr17 and Gr19 of 2×1 pixels each having a Gr color.

The first center pixel group Gb18 and Gb20 of the center pixel group 210 may have the same color pixels as a second color pixel group 224 of the color pixel group 220, and the second center pixel group Gr17 and Gr19 of the center pixel group 210 may have the same color pixels as a third color pixel group 226 of the color pixel group 220.

Since the color pixel group 220 illustrated in FIG. 7 has the same configuration as the color pixel group 120 illustrated in FIG. 2, descriptions thereof are omitted.

The micro-lenses may be top-bottom symmetrically disposed as units of 2×1 pixels at the top of each of first to fourth color pixel groups 222, 224, 226 and 228 and the first center pixel group Gb18 and Gb20 and the second center pixel group Gr17 and Gr19 of the center pixel group 210 to detect phase differences therebetween.

That is, the micro-lenses may be symmetrically disposed in a vertical direction for each 2×1 pixel in the 6×6 unit pixel group.

Figure 8:
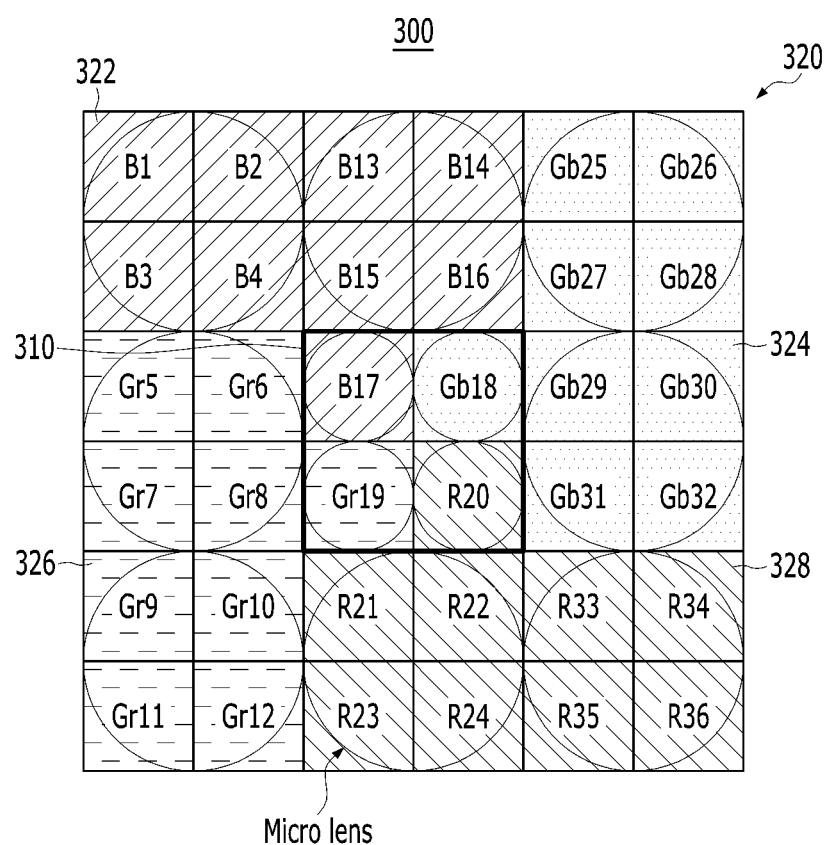
FIG. 8 is a diagram illustrating an image sensor including a pixel array disposed as a 6×6 unit pixel group in accordance with an embodiment of the present disclosure.

Hereinafter, an image sensor 300 including a pixel array disposed as a 6×6 unit pixel group according to yet another embodiment of the present disclosure is described with reference to FIG. 8. FIG. 8 is a diagram illustrating the image sensor 300 including the pixel array disposed as the 6×6 unit pixel group in accordance with an embodiment of the present disclosure.

As illustrated in FIG. 8, the image sensor 300 according to the embodiment includes a center pixel group 310, a color pixel group 320 and micro-lenses, in the 6×6 unit pixel group.

The center pixel group 310 is disposed as 2×2 pixels in a center area of the 6×6 unit pixel group and has different colors. The center pixel group 310 may include a first 1×1 pixel B17 having a B color, a second 1×1 pixel Gb18 having a Gb color, a third 1×1 pixel Gr19 having a Gr color and a fourth 1×1 pixel R20 having an R color.

The first 1×1 pixel B17 of the center pixel group 310 may have the same color as a first color pixel group 322 of the color pixel group 320, the second 1×1 pixel Gb18 of the center pixel group 310 may have the same color as a second color pixel group 324 of the color pixel group 320, the third 1×1 pixel Gr19 of the center pixel group 310 may have the same color as a third color pixel group 326 of the color pixel group 320, and the fourth 1×1 pixel R20 of the center pixel group 310 may have the same color as a fourth color pixel group 328 of the color pixel group 320.

Since the color pixel group 320 illustrated in FIG. 8 has the same configuration as the color pixel group 120 illustrated in FIG. 2, descriptions thereof are omitted.

The micro-lenses may include first micro-lenses and second micro-lenses.

The first micro-lenses may be top-bottom and left-right symmetrically disposed as units of 2×2 pixels at the top of each of the first to fourth color pixel groups 322, 324, 326 and 328.

The second micro-lenses may be disposed as units of 1×1 pixels at the top of each of the first to fourth 1×1 pixels B17, Gb18, Gr19 and R20 to respectively cover the first to fourth 1×1 pixels B17, Gb18, Gr19 and R20.

Figure 9:
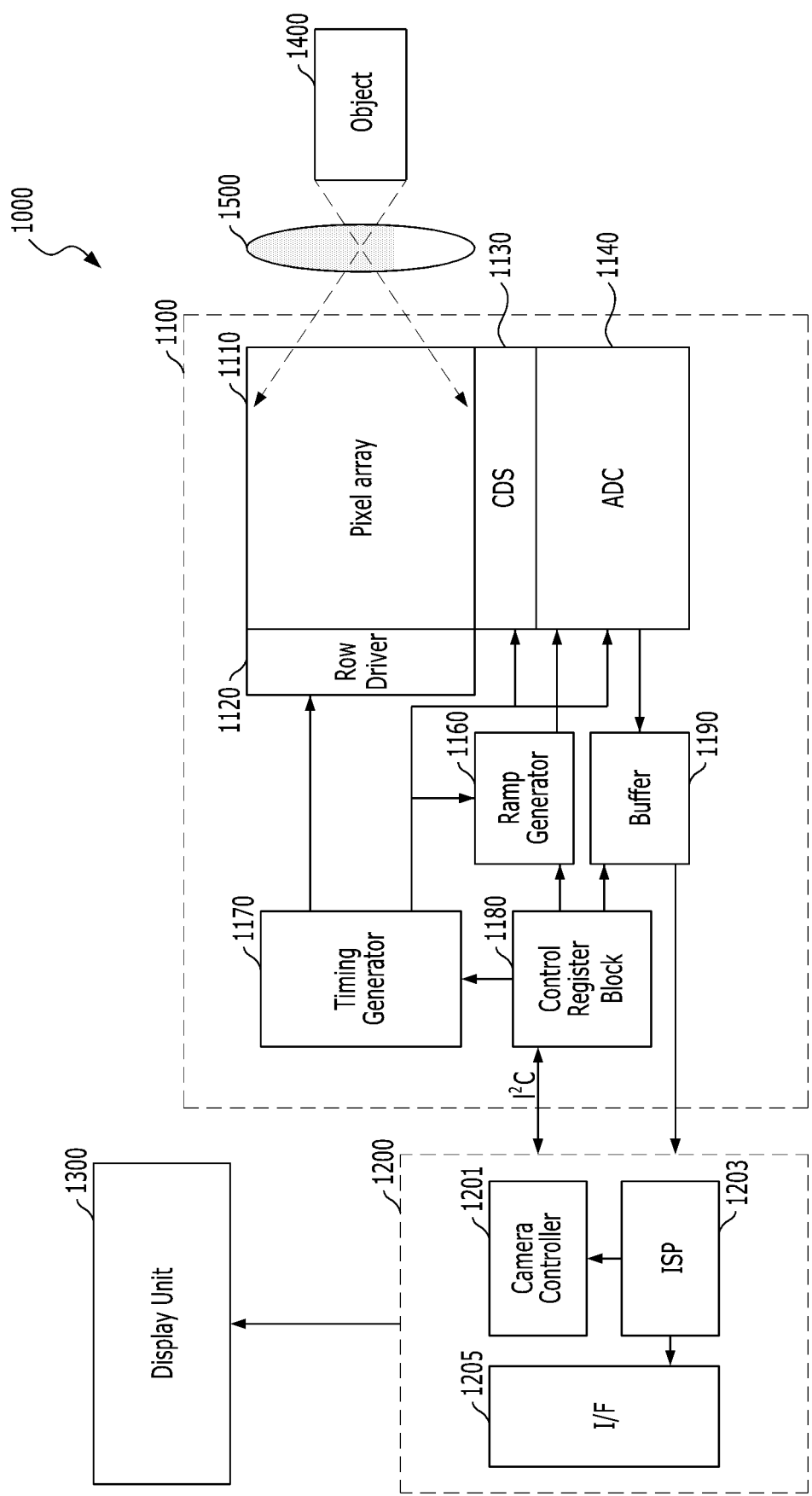
FIG. 9 is a diagram illustrating a schematic configuration of an image processing system including a pixel array in accordance with an embodiment of the present disclosure.

FIG. 9 is a schematic block diagram illustrating an image processing system 1000 including a pixel array 1110 in accordance with an embodiment of the present disclosure.

As illustrated in FIG. 9, the image processing system 1000 may include an image sensor 1100, a digital signal processor (DSP) 1200, a display unit 1300 and a lens module 1500.

The image sensor 1100 may include a pixel array 1110, a row driver 1120, a correlated double sampling (CDS) block 1130, an analog-to-digital converter (ADC) block 1140, a ramp signal generator 1160, a timing generator 1170, a control register block 1180 and a buffer 1190.

The image sensor 1100 may detect an optical image of an object 1400, which is captured through the lens module 1500, under the control of the DSP 1200. The DSP 1200 may output an image, which is detected and outputted by the image sensor 1100, to the display unit 1300. The display unit 1300 is a device which may display the image outputted from the DSP 1200. For example, the display unit 1300 may be a computer, a mobile communication device and terminals of other image output devices.

The DSP 1200 may include a camera controller 1201, an image signal processor (ISP) 1203 and an interface (I/F) 1205.

The camera controller 1201 may control the operation of the control register block 1180. The camera controller 1201 may control the operation of the image sensor 1100, that is, the operation of the control register block 1180, by using an I2C (inter-integrated circuit), but the technical spirit of the present disclosure is not limited thereto.

The ISP 1203 may receive an image (or image data), may process the received image for human recognition, and output the processed image through the I/F 1205 to the display unit 1300. Although FIG. 7 illustrates that the ISP 1203 is located in the DSP 1200, the ISP 1203 may be located in the image sensor 1100 in different embodiments. In addition, the image sensor 1100 and the ISP 1203 may be implemented in a single package, for example, a multi-chip package (MCP).

The pixel array 1110 may include the pixel array according to the embodiments described above. Specifically, the pixel array 1110 may include a center pixel group including 2×2 pixels disposed in a center area of a 6×6 unit pixel group to have at least two different colors, and first to fourth color pixel groups having the same color as one pixel of the center pixel group, disposed as units of 2×4 pixels to surround the center pixel group and respectively having different colors.

Figure 10:
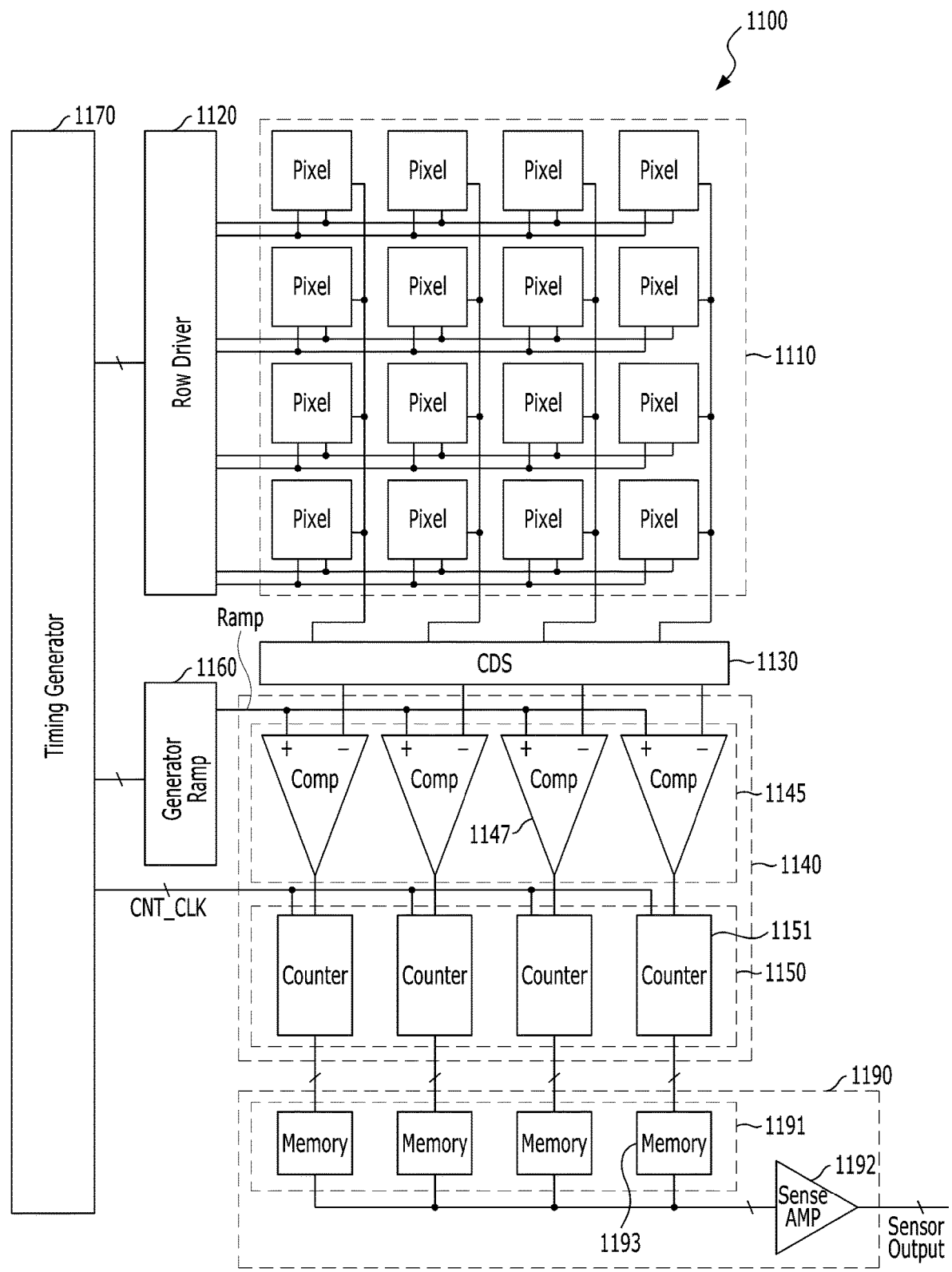
FIG. 10 is a diagram illustrating a detailed configuration of an image sensor illustrated in FIG. 9 in accordance with an embodiment of the present disclosure.

FIG. 10 is a specific block diagram illustrating the image sensor 1100 illustrated in FIG. 9 in accordance with an embodiment of the present disclosure.

Referring to FIGS. 9 and 10, the timing generator 1170 may generate at least one control signal for controlling the operations of the row driver 1120, the CDS block 1130, the ADC block 1140 and the ramp signal generator 1160. The control register block 1180 may generate at least one control signal for controlling the operations of the ramp signal generator 1160, the timing generator 1170 and the buffer 1190. The control register block 1180 may operate under the control of the camera controller 1201.

The row driver 1120 may drive the pixel array 1110 in units of rows. For example, the row driver 1120 may generate a selection signal for selecting one of a plurality of rows. Each of the plurality of rows includes a plurality of pixels. The arrangement of the plurality of pixels illustrated in FIG. 8 is schematically illustrated for convenience in description, and the plurality of pixels may include the pixel array according to the embodiments described above.

Each of the plurality of pixels may sense incident light, and output an image reset signal and an image signal to the CDS block 1130. Specifically, the pixel array 1110 may include a center pixel group including 2×2 pixels in a center area to have different colors in a 6×6 unit pixel group, and first to fourth color pixel groups having the same color as one pixel of the center pixel group, disposed as units of 2×4 pixels to surround the center pixel group and respectively having different colors.

The CDS block 1130 may perform a correlated double sampling operation on each of the received image reset signal and image signal.

The ADC block 1140 may compare a ramp signal Ramp, which is outputted from the ramp signal generator 1160, with a correlated double sampled signal, which is outputted from the CDS block 1130, output a comparison signal, count level transition time of the comparison signal according to a clock signal CNT_CLK, and output a count value to the buffer 1190.

The ADC block 1140 may include a comparison block 1145 and a counter block 1150. The comparison block 1145 may include a plurality of comparators Comp. Each of the plurality of comparators Comp is coupled to the CDS block 1130 and the ramp signal generator 1160. Each of a plurality of output signals outputted from the CDS block 1130 is inputted to a first input terminal of each of the comparators Comp, for example, a (−) input terminal, and the ramp signal Ramp outputted from the ramp signal generator 1160 is inputted to a second input terminal of each of the comparators Comp, for example, a (+) input terminal.

The plurality of comparators Comp may receive the respective output signals, which are outputted from the CDS block 1130, and the ramp signal Ramp, which is outputted from the ramp signal generator 1160, compare the respective output signals with the ramp signal Ramp, and output the comparison signals. For example, the comparison signal outputted from a first comparator 1147 for comparing a signal outputted from each of the plurality of pixels with the ramp signal Ramp may correspond to a difference between the image signal and the image reset signal, which varies according to illuminance of light incident from the outside.

The ramp signal generator 1160 may operate under the control of the timing generator 1170.

The counter block 1150 may include a plurality of counters 1151. The plurality of counters 1151 are respectively coupled to output terminals of the comparators Comp. The counter block 1150 may count the level transition time of the comparison signal according to the clock signal CNT_CLK outputted from the timing generator 1170, and output a digital signal, that is, a count value. The counter block 1150 may output a plurality of digital image signals. Each of the plurality of counters 1151 may be implemented as an up/down counter or a bit-wise inversion counter.

The buffer 1190 may store each of the plurality of digital image signals outputted from the ADC block 1140, sense and amplify each of the stored digital image signals, and output the amplified digital image signals. The buffer 1190 may include a memory block 1191 and a sense amplifier 1192. The memory block 1191 may include a plurality of memories 1193 each for storing a count value outputted from each of the plurality of counters 1151. For example, the count value may refer to a count value associated with signals outputted from the plurality of pixels.

The sense amplifier 1192 may sense and amplify each of the count values outputted from the memory block 1191. The image sensor 1100 may output image data to the DSP 1200.

According to embodiments of the present disclosure, the image sensor and the image processing system may implement a 4-sum mode or 8-sum mode operation in a quad pattern while using the existing 2×2 driving mode, thereby increasing output readout speed of the image sensor.

In addition, as micro-lenses are left-right or top-bottom symmetrically disposed at the top of each of a center group and color filters in a 6×6 unit pixel, a phase difference may be detected.

These effects and advantages of the present disclosure are not limited to the embodiments described above, and other effects and advantages not described herein will become apparent to those skilled in the art of the present disclosure from the above-detailed description.

While the present disclosure has been illustrated and described with respect to specific embodiments, the disclosed embodiments are provided for the description, and not intended to be restrictive. Further, it is noted that the present disclosure may be achieved in various embodiments that fall within the scope of the following claims, as those skilled in the art will recognize in light of the present disclosure. Moreover, the embodiments mat be combined to form additional embodiments.

What is claimed is:

1. An image sensor comprising:
   a center pixel group including 2×2 pixels having at least two different colors and disposed in a center area of a 6×6 unit pixel group; and
   first to fourth color pixel groups each corresponding to respective colors, disposed as units of 2×4 pixels or 4×2 pixels to surround the center pixel group,
   wherein the first to fourth color pixel groups have different colors between the first to fourth color pixel groups, and
   each of the first to fourth color pixel groups includes the 2×4 pixels or the 4×2 pixels having same color.

2. The image sensor of claim 1, wherein each of the first to fourth color pixel groups includes:
   a first sub-color pixel group including a plurality of first photodiodes and a first floating diffusion node sharing the plurality of first photodiodes; and
   a second sub-color pixel group including a plurality of second photodiodes and a second floating diffusion node sharing the plurality of second photodiodes,
   wherein the first and second sub-color pixel groups are comprised of same color pixels.

3. The image sensor of claim 2, wherein each of the first to fourth color pixel groups further comprises a dual gain conversion transistor suitable for selectively coupling the first floating diffusion node to the second floating diffusion node.

4. The image sensor of claim 1, further comprising micro-lenses disposed to cover the center pixel group and the first to fourth color pixel groups and suitable for sharing pixels having the same color and included in each of the center pixel group and the first to fourth color pixel groups.

5. The image sensor of claim 4, wherein the shared pixels having the same color and included in each of the first to fourth color pixel groups include 2×1 pixels, 1×2 pixels or 2×2 pixels.

6. The image sensor of claim 4, wherein the shared pixels having the same color and included in the center pixel group include 2×1 pixels or 1×2 pixels.

7. The image sensor of claim 1, further comprising: when center pixels of the center pixel group include four different 1×1 color pixels,
   a first micro-lens disposed to cover each of 2×2 pixels of the first to fourth color pixel groups and suitable for sharing the 2×2 pixels having the same color and included in each of the first to fourth color pixel groups; and a second micro-lens disposed to cover each of the center pixels.

8. An image sensor comprising:
a first sub-color pixel group including a plurality of first photodiodes and a first floating diffusion node sharing the plurality of first photodiodes;
a second sub-color pixel group including a plurality of second photodiodes and a second floating diffusion node sharing the plurality of second photodiodes; and
a dual gain conversion transistor suitable for selectively coupling the first floating diffusion node to the second floating diffusion node,
wherein the first sub-color and second sub-color pixel groups have the same color pixel.

9. An image processing system comprising:
an image sensor suitable for detecting an optical image of a subject and outputting image data;
a digital signal processor suitable for receiving the image data, processing the received image, and providing an output image; and
a display device suitable for displaying the output image, wherein the image sensor includes:
a center pixel group including 2×2 pixels having at least two different colors and disposed in a center area of a 6×6 unit pixel group; and
first to fourth color pixel groups each corresponding to respective colors, disposed as units of 2×4 pixels or 4×2 pixels to surround the center pixel group,
wherein the first to fourth color pixel groups have different colors between the first to fourth color pixel groups, and
each of the first to fourth color pixel groups includes the 2×4 pixels or the 4×2 pixels having same color.

10. The image processing system of claim 9, wherein each of the first to fourth color pixel groups includes:
a first sub-color pixel group including a plurality of first photodiodes and a first floating diffusion node sharing the plurality of first photodiodes;
a second sub-color pixel group including a plurality of second photodiodes and a second floating diffusion node sharing the plurality of second photodiodes, wherein the first and second sub-color pixel groups are comprised of same color pixels; and
a dual gain conversion transistor suitable for selectively coupling the first floating diffusion node to the second floating diffusion node.

11. The image processing system of claim 9, wherein first 1×2 pixels of the center pixel group have same color as the first color pixel group, and second 1×2 pixels of the center pixel group having a same color as the second color pixel group.

12. The image processing system of claim 11, further comprising micro-lenses left-right symmetrically disposed as units of 1×2 pixels to cover the first to fourth color pixel groups and the first and second 1×2 pixels of the center pixel group.

13. The image processing system of claim 9, wherein first 2×1 pixels of the center pixel group have a same color as the first color pixel group, and second 2×1 pixels of the center pixel group have a same color as the second color pixel group.

14. The image processing system of claim 13, further comprising micro-lenses top-bottom symmetrically disposed as units of 2×1 pixels to cover the first to fourth color pixel groups and the first and second 2×1 pixels of the center pixel group.

15. The image processing system of claim 13, wherein a first 1×1 pixel of the center pixel group has a same color as the first color pixel group, a second 1×1 pixel of the center pixel group has a same color as the second color pixel group, a third 1×1 pixel of the center pixel group has a same color as the third color pixel group, and a fourth 1×1 pixel of the center pixel group has a same color as the fourth color pixel group.

16. The image processing system of claim 15, further comprising:
first micro-lenses top-bottom and left-right symmetrically disposed as units of 2×2 pixels to cover each of the first to fourth color pixel groups; and
second micro-lenses disposed to cover each of the first to fourth 1×1 pixels of the center pixel group.

17. An image sensor comprising:
a center pixel group having at least two sub-pixel groups each corresponding to different colors; and
a plurality of boundary pixel groups each corresponding to respective colors, and disposed to surround the center pixel group,
wherein the center pixel group and the boundary pixel groups are configured to form a 6×6 unit pixel group having a top row and a bottom row opposed to the top row,
wherein the center pixel group has 2×2 pixels, and the plurality of boundary pixel groups have different colors between the plurality of boundary pixel groups, and
each of the plurality of boundary pixel groups includes 2×4 pixels or 4×2 pixels having same color.

18. The image sensor of claim 17, wherein the boundary pixel groups include:
a first color pixel group of 2×4 B pixels disposed at an upper left portion of the top side of the 6×6 unit pixel group;
a second color pixel group 4×2 Gb pixels disposed at an upper right portion of the top side of the 6×6 unit pixel group;
a third color pixel group of 4×2 Gr pixels disposed at a lower left portion of the bottom side of the 6×6 unit pixel group; and
a fourth color pixel group of 2×4 R pixels disposed at a lower right portion of the bottom side of the 6×6 unit pixel group.

19. The image sensor of claim 18, wherein the center pixel group includes:
a first center pixel group having 1×2 Gb pixels; and
a second center pixel group having 1×2 Gr pixels.

20. The image sensor of claim 18, wherein the center pixel group includes:
a first center pixel group having 2×1 Gr pixels; and
a second center pixel group having 2×1 Gb pixels.

21. The image sensor of claim 18, wherein the center pixel group includes:
a 1×1 B pixel disposed at an upper left portion of the center pixel group relative to the top side of the 6×6 unit pixel group;
a 1×1 Gb pixel disposed at an upper right portion of the center pixel group relative to the top side of the 6×6 unit pixel group;
a 1×1 Gr pixel disposed at a lower left portion of the center pixel group relative to the bottom side of the 6×6 unit pixel group; and a 1×1 R pixel disposed at a lower right portion of the center pixel group relative to the bottom side of the 6×6 unit pixel group.

\* \* \* \* \*